3,539,446
OIL FILTER PAPER INCLUDING PHENOLIC RESIN AND CHROME OXIDE AND METHOD FOR MAKING SAME

Charles A. Charron, York, Pa., assignor, by mesne assignments, to Rochester Paper Company, a corporation of Michigan
No Drawing. Filed Dec. 29, 1967, Ser. No. 694,369
Int. Cl. D21h 3/52
U.S. Cl. 162—146      5 Claims

ABSTRACT OF THE DISCLOSURE

An oil filter paper is loaded with a phenolic resin with greater efficiency by virtue of increased exhaustion techniques due to the incorporation of either asbestos fibers or chrome oxide to the pulp slurry prior to the manufacture of the paper by conventional steps.

---

It is known that oil filter papers must not be weakened, disintegrated or deteriorated when subjected to the materials which they are to filter such as oil. They must also possess certain rigidity. Such filters have for a long time been made of a resin-impregnated paper; the resin coating the fibers thereof and protecting them against any adverse effect that might be had thereon by the material being filtered. Furthermore, the resin gives strength to the paper by making it relatively rigid. The first oil filter papers employed for filtering the oil used in internal combustion engines were termed "part-flow filter papers" because only a portion of the oil used in the engines was filtered on each pass. Present-day oil filter papers, however, must be "full-flow" papers, that is, they must pass all of the oil used in an engine. There is normally provided a by-pass about a filter but this operates only when the oil pressure builds up as a result of plugging up of the pores of the paper with accumulated sludge, etc. To be completely satisfactory, a present-day oil filter paper must be sufficiently porous to allow free flow of oil therethrough at normal engine pressures and must be of long life, that is, not plug up too quickly. Furthermore, it must be resistant to chemical attack by the material being filtered. This last characteristic in resin impregnated filter papers is of course dependent upon the dispersion of the resin throughout the paper in such a manner that all of the fibers thereof are thoroughly coated. This of course must be accomplished without lowering the porosity to a point that will prevent a predetermined desired flow of fluid therethrough.

Resin impregnated filter papers have heretofore been manufactured in a variety of ways. They have, for example, been made by adding the resin to the furnish in a beater along with an acidic precipitating agent which causes the resin to be deposited upon the fibers. Subsequently, the paper is made in the usual manner. This type of paper has also been made by wet impregnation of a paper web immediately after it leaves the paper making machine and prior to drying. In this manner substantially more resin can be incorporated into the paper than by the aforementioned beater addition method. Resin impregnated filter papers have also been made by impregnating dry webs of paper with resin, though in this case the resin is not apt to be so uniformly deposited through the paper. From the point of view of economy, the beater addition method is the best method of making the type of filter paper with which this invention is particularly concerned, namely an oil filter paper. The term "beater addition method" is used herein to cover a method of making resin impregnated paper in which the resin is added to a paper machine head box as well as the aforementioned method in which the resin is added to the furnish in a beater proper.

The principal drawback of the beater addition method is that considerable resin may be wasted because it will not have been completely precipitated onto the fibers and will be carried away by the water at the paper making machine wire or cylinder. It has been discovered, however, that this resin loss can be substantially reduced if the resin-fiber containing slurry is treated with the addition of either chrysotile asbestos or chrome oxide prior to the aforementioned formation of the paper web.

Broadly, this invention therefore contemplates an addition of an exhaustion adjuvant such as chrysotile asbestos and chrome oxide and a resin to a pulp slurry satisfactory for filter paper use, prior to the deposition of the slurry mixture upon the screen of a paper making machine.

More specifically, the invention contemplates the preparation of the pulp in a washer or beater. The pulp should be one of a type normally used for making filter papers and is, according to this invention, advantageously made up of cotton linters, for example, Hercules #46 cotton linters, or it may be in certain instances an unbleached sulphate from southern pine wood, or various bleached or unbleached northern or southern soft woods. The advantage gained by using cotton linters is that a highly porous paper will be obtained even though the pulp is beaten to a lower freeness than most wood pulps. The precipitant is then advantageously added to the pulp in the washer or beater and in sufficient quantity to render the pulp acid to the extent that it has a pH of from 2.5 to 3.5. After addition of the ingredients, the pulp containing slurry is then fed to a refiner such as a Jordan. It is discharged from the refiner into a mix-box where a suitable amount of resin, one of the beater addition types, is added in an amount such that it will comprise about 15% to 45% by weight of the final product with a retention of at least 55% due to the inclusion of the chrysotile asbestos or chrome oxide. The amount of chrysotile asbestos ranges from a small but perceptible amount to 5% by weight of the total solids content of the slurry. The amount of the chrome oxide ranges from a small but perceptible amount to 2% by weight of the total solids content of the slurry. The pulp-resin slurry with the small amount of chrysotile asbestos or chrome oxide added is then fed to a pump by which it is lifted to the head box of a paper-making machine. The paper is then produced as in a conventional process.

An applicable phenolic resin is Synco Grade 832, sold by the Snyder Chemical Company of Bethel, Conn. It is a phenol formaldehyde resin emulsion and is but one of a number of this type that may be employed in the invention. Such resins can be made by reacting phenol and/or its analogues with formaldehyde in the presence of an alkaline condensing agent. The mol ratios of phenol to formaldehyde should preferably be in the range of 1:1 to 1:2.5. The condensation is carried to an end point of a liquid with water solubility limited to a degree suitable for paper-making practice. Such a resin, when over a certain amount of water is present, kicks out, that is, precipitates. The maintenance of the pH of the slurry at a low level of at least as low as 3.5 aids in the precipitation of the resin.

In order to further illustrate the present invention, attention is directed to the following examples.

EXAMPLE I

| | Percentage by weight |
|---|---|
| Cotton linters | 39 |
| High alpha-kraft (bleached) | 18 |
| Chrysotile asbestos fibers | 5 |
| Water dilutable phenol-formaldehyde resin | 38 |
| | 100 |

The fibrous materials were dispersed in a beater and dumped into a stock chest. The resin was slowly added as the mixture was only agitated mildly so as to preclude foaming before exhaustion. The contact time was at least 15 minutes. The water temperature was 54° F. and the pH was lowered to less than 3.5. Another contact time of 15 minutes was required to insure maximum precipitation.

The resultant slurry was then utilized to produce a paper by employing a conventional paper machine.

EXAMPLE II

|  | Percentage by weight |
|---|---|
| Cotton linters containing 10% by weight of 3 denier rayon ⅜" cut, based on the weight of the cotton linters | 61 |
| Chrome oxide | 1 |
| Water dilutable phenol-formaldehyde resin | 38 |
|  | 100 |

The paper was made as in accordance with Example I.

The characteristics of the paper made in the above examples are as follows:

|  | Example I | Example II |
|---|---|---|
| Basic weight in pounds per ream (24" x 36"—500 sheets) | 140 | 60 |
| Thickness in inches | .048 | .028 |
| Stiffness (Gurley) MD, mgs | 7,120 | |
| Stiffness (Gurley) CD, mgs | 3,110 | |
| Tensile, lb./in., MD | 20.3 | 9.3 |
| Tensile, lb./in., CD | 8.9 | 3.8 |
| Mullen, lb/in.² | 17 | 15 |
| Air Permeability, c.f.m./ft.² at 0.5" P | 27.5 | 75 |
| Depth of corrugations, inches | .015 | .012 |
| Resin content, percent | 28.0 | 26.0 |
| Resin retention, percent | 69.6 | 57.0 |

To illustrate the advantages obtainable, a comparison was made between the product of Example I and a conventionally produced paper having a phenolic resin retention of 45%. The comparison concerned dust (in air) filtration characteristics. The papers otherwise had nearly identical physical properties.

| Sample | Capacity, grams | Efficiency, percent |
|---|---|---|
| Example I | 77.0 | 99.60 |
| Conventional paper | 61.0 | 96.44 |

Capacity is amount of dust in grams retained on a 900 sq. in. surface sample up to a point where pressure drop across the material thickness was 10" of water.

The efficiency refers to percentage dust retained in filter as a function of the total amount fed (feed concentration was 0.10 gm. dust/cu. ft. air; feed velocity 35 ft./min.).

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A method for making oil filter paper comprising preparing a slurry having a pH of less than 3.5 containing cellulosic fibers, phenol-formaldehyde resin and chrome oxide as a resin exhaustion assistant and then preparing a paper from said slurry, said resin being present in said slurry in an amount such that it will comprise from about 15% to about 45%, by weight, of said paper and said chrome oxide being present in said slurry in an amount ranging from a small but perceptible amount of 2% by weight of the total solids content of said slurry, said amount of chrome oxide being sufficient in insure a resin retention percentage in said paper of at least 55% by weight of said resin content of said slurry.

2. The method of claim 1 wherein said cellulosic fibers comprise a mixture of cotton linters and alpha-kraft fibers.

3. The method of claim 1 wherein said cellulosic fibers comprise a mixture of cotton linters and rayon fibers.

4. The method of claim 3 wherein the quantity of said mixture is 61%, by weight, of the total solids content of said slurry, said mixture containing 10%, by weight, of said rayon fibers; the quantity of said resin is 38%, by weight, of the total solids content of said slurry, and the quantity of said chrome oxide is 1%, by weight, of the total solids content of said slurry.

5. The product produced by the process of claim 1.

References Cited

UNITED STATES PATENTS 2,895,868   7/1959   Magill _____ 162—165

FOREIGN PATENTS 747,283   11/1966   Canada.

S. LEON BASHORE, Primary Examiner

T. G. SCAVONE, Assistant Examiner

U.S. Cl. X.R.

162—155, 165, 181, 182